US012459500B2

United States Patent
Munemura et al.

(10) Patent No.: US 12,459,500 B2
(45) Date of Patent: Nov. 4, 2025

(54) VEHICLE DRIVE ASSIST APPARATUS

(71) Applicant: SUBARU CORPORATION, Tokyo (JP)

(72) Inventors: Wataru Munemura, Tokyo (JP); Shota Yasuda, Tokyo (JP); Shigeki Mukai, Tokyo (JP); Kazuyuki Takahashi, Tokyo (JP); Hiroaki Kuramochi, Tokyo (JP); Seiya Sato, Tokyo (JP); Hiroki Maniwa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 170 days.

(21) Appl. No.: 18/067,416

(22) Filed: Dec. 16, 2022

(65) Prior Publication Data

US 2023/0227024 A1 Jul. 20, 2023

(30) Foreign Application Priority Data

Jan. 19, 2022 (JP) ................................. 2022-006674

(51) Int. Cl.
*B60W 30/09* (2012.01)
*B60Q 9/00* (2006.01)
(Continued)

(52) U.S. Cl.
CPC ............. *B60W 30/09* (2013.01); *B60Q 9/008* (2013.01); *B60W 10/18* (2013.01); *B60W 10/20* (2013.01);
(Continued)

(58) Field of Classification Search
CPC ...... B60W 30/09; B60W 10/18; B60W 10/20; B60W 40/02; B60W 2420/403;
(Continued)

(56) References Cited

U.S. PATENT DOCUMENTS 5,475,494 A * 12/1995 Nishida .................. G06V 20/58
340/436
10,902,263 B1 * 1/2021 Angel ..................... A61H 3/061
(Continued)

FOREIGN PATENT DOCUMENTS

| JP | 2016-061706 A | 4/2016 |
| JP | 2017-102835 A | 6/2017 |
| JP | 2019-018733 A | 2/2019 |

OTHER PUBLICATIONS

Office Action issued on Aug. 26, 2025 in the corresponding Japanese patent application No. 2022-006674, w/ English Translation.

*Primary Examiner* — Abby J Flynn
*Assistant Examiner* — Matthew John Moscola
(74) *Attorney, Agent, or Firm* — Rimon P.C.

(57) ABSTRACT

A vehicle drive assist apparatus for avoiding collision of a vehicle with a recognized object recognizes a surrounding environment around the vehicle; acquires feature information of a three-dimensional object in the surrounding environment; sets a traveling path of the vehicle based on the surrounding environment; recognizes an aerial object based on the feature information; identify a type of the aerial object based on the feature information; determines whether the aerial object has a possibility of hindering traveling of the vehicle; performs steering control based on a control signal; continues normal traveling control when the aerial object does not have the hindrance possibility; estimates a falling point of the aerial object when the aerial object has the hindrance possibility; when the falling point is on the traveling path of the vehicle, sets a new traveling path to steer around the falling point and executes traveling control along the new traveling path.

20 Claims, 5 Drawing Sheets

(51) Int. Cl.
*B60W 10/18* (2012.01)
*B60W 10/20* (2006.01)
*B60W 40/02* (2006.01)
*G06V 10/40* (2022.01)
*G06V 20/58* (2022.01)
*G06V 20/64* (2022.01)
*G08G 1/16* (2006.01)

(52) U.S. Cl.
CPC ............. *B60W 40/02* (2013.01); *G06V 10/40* (2022.01); *G06V 20/58* (2022.01); *G06V 20/64* (2022.01); *G08G 1/165* (2013.01); *B60W 2420/403* (2013.01); *B60W 2554/4041* (2020.02); *B60W 2710/18* (2013.01); *B60W 2710/20* (2013.01)

(58) Field of Classification Search
CPC ..... B60W 2554/4041; B60W 2710/18; B60W 2710/20; B60W 60/0016; B60W 60/00272; B60W 2050/143; B60W 2050/146; B60W 2552/10; B60W 2554/402; B60W 2554/802; B60W 2554/804; B60W 50/14; B60Q 9/008; G06V 10/40; G06V 20/58; G06V 20/64; G08G 1/165; G08G 1/166
See application file for complete search history.

(56) References Cited

U.S. PATENT DOCUMENTS

| | | | |
|---|---|---|---|
| 2007/0071311 A1* | 3/2007 | Rovira-Mas | G06T 7/70 382/104 |
| 2016/0339959 A1* | 11/2016 | Lee | G06V 20/588 |
| 2017/0287186 A1* | 10/2017 | Saito | G06T 11/60 |
| 2018/0208196 A1* | 7/2018 | Kurata | G06V 20/584 |
| 2018/0281793 A1* | 10/2018 | Terayama | B60W 30/0956 |
| 2018/0284789 A1* | 10/2018 | Oguro | B60W 30/09 |
| 2022/0118906 A1* | 4/2022 | Wang | B60W 60/0015 |
| 2023/0298358 A1* | 9/2023 | Levi | H04N 25/76 382/103 |
| 2024/0233392 A1* | 7/2024 | Goto | G06V 10/60 |

\* cited by examiner

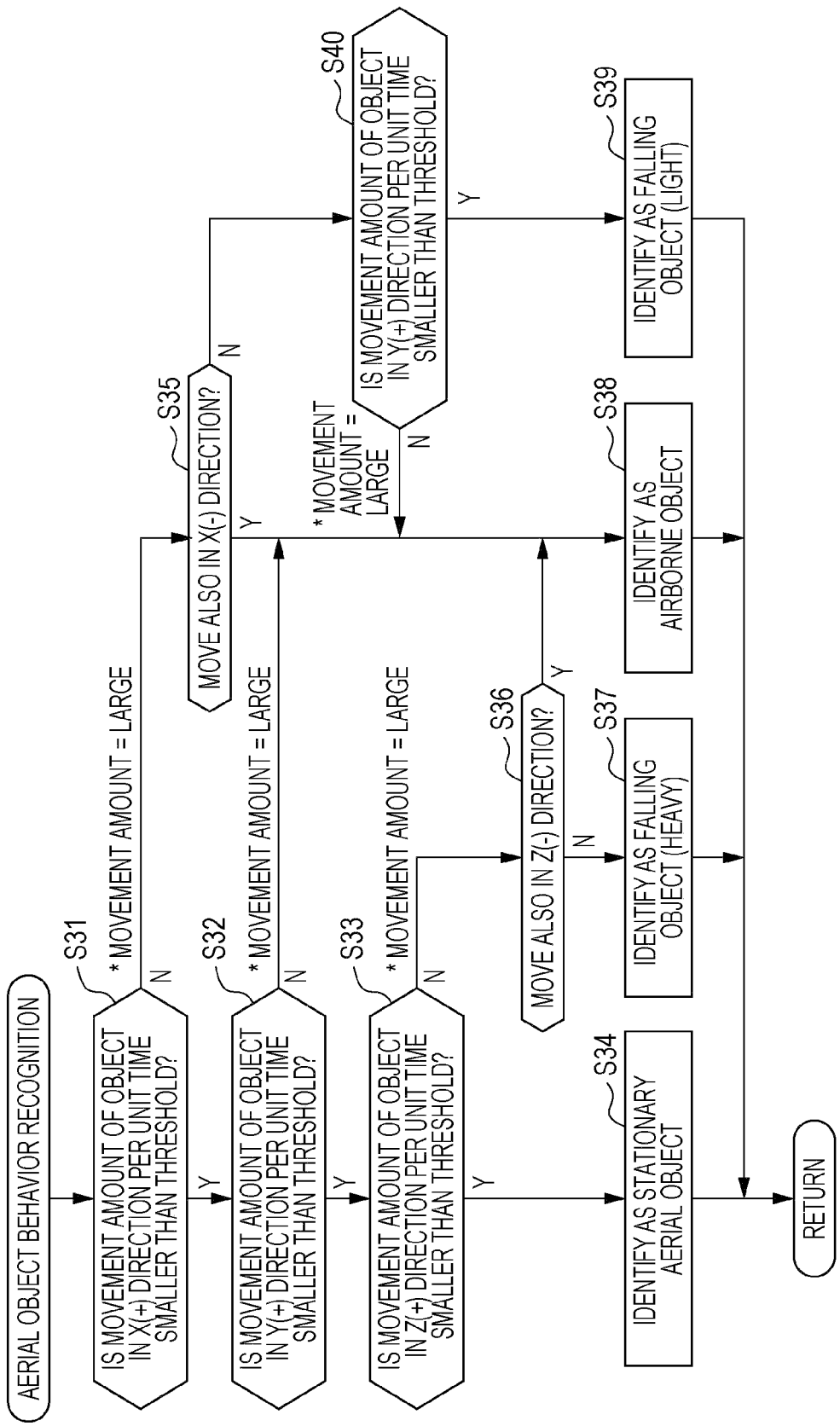

VEHICLE DRIVE ASSIST APPARATUS

CROSS-REFERENCE TO RELATED APPLICATIONS

The present application claims priority from Japanese Patent Application No. 2022-006674 filed on Jan. 19, 2022, the entire contents of which are hereby incorporated by reference.

BACKGROUND

The disclosure relates to a vehicle drive assist apparatus that performs drive assist control for avoiding collision with an object recognized based on surrounding environment information acquired by using an on-board camera device and the like.

In the field of vehicles such as automobiles, autonomous driving control technologies have been developed to cause the vehicles to autonomously travel without driving operations of drivers who drive the vehicles. Various drive assist apparatuses using the autonomous driving control technologies have been proposed and put into practical use to perform various types of traveling control for assisting driving operations of drivers.

Related-art drive assist apparatuses use sensing devices such as an on-board camera device and an on-board radar device as a surrounding environment recognition device that recognizes the surrounding environment around a vehicle and acquires the surrounding environment as surrounding information. The on-board camera device recognizes the surrounding environment around the vehicle based on acquired image data. The on-board radar device recognizes the surrounding environment around the vehicle by outputting radio waves to the surroundings of the vehicle, receiving the reflected radio waves from objects, and analyzing the received radio waves.

Each related-art drive assist apparatus causes the vehicle to travel while recognizing the surrounding environment around the vehicle by using the sensing devices. For example, when an object that may hinder the traveling of the vehicle is recognized on a traveling path of the vehicle, emergency braking control or emergency steering control is performed to prevent collision between the vehicle and the object. Thus, the vehicle can continue to travel safely. The control technology such as a drive assist apparatus having an obstacle avoidance control function for avoiding collision with an obstacle such as a three-dimensional object has variously been proposed and put into practical use as in, for example, Japanese Unexamined Patent Application Publication No. 2019-18733.

Examples of the objects to be recognized by the related-art drive assist apparatus include various road marks such as lane lines and planar structures such as manholes (hereinafter referred to simply as "lane lines etc."). There are three-dimensional objects on roads, such as permanently installed stationary objects typified by roadside curbstones, guardrails, traffic signs, utility poles, and billboards, and moving objects typified by pedestrians, bicycles, other vehicles, and animals. Further, there are various three-dimensional objects on roads, such as temporarily installed stationary objects typified by signage and traffic cones near construction sites, and objects that have fallen from luggage spaces of other vehicles.

For example, empty plastic bags may float in the air (away from road surfaces) due to wind or the like because of their small mass (hereinafter referred to as "airborne objects").

The surrounding environment recognition device of the related-art drive assist apparatus may recognize the various objects described above.

The surrounding environment recognition device of the related-art drive assist apparatus may also recognize, for example, objects that are falling from luggage spaces of other vehicles (relatively heavy objects) or flying toward roads due to strong wind (relatively light objects such as empty cardboard boxes) but have not yet fallen onto the roads, that is, remain in the air (away from road surfaces) (hereinafter referred to as "falling objects").

When a three-dimensional object that satisfies a predetermined condition among the various objects described above is recognized on the traveling path of the vehicle, the related-art drive assist apparatus recognizes the three-dimensional object as an object that may hinder the traveling of the vehicle. In this case, the drive assist apparatus executes the obstacle avoidance control including the emergency braking control or the emergency steering control for avoiding collision with the recognized object.

The airborne objects described above are unlikely to hinder the traveling of the vehicle. The falling objects do not hinder the traveling of the vehicle unless they fall onto the traveling path of the vehicle.

SUMMARY

An aspect of the disclosure provides a vehicle drive assist apparatus to be applied to a vehicle. The vehicle drive assist apparatus is configured to execute control for avoiding collision of the vehicle with a recognized object. The vehicle drive assist apparatus includes a surrounding environment recognition device, a traveling control unit, and a steering control unit. The surrounding environment recognition device includes a recognizer and a feature information acquirer. The recognizer is configured to recognize a surrounding environment around the vehicle. The feature information acquirer is configured to acquire feature information of a three-dimensional object in the recognized surrounding environment. The traveling control unit is configured to centrally control a whole of the vehicle. The traveling control unit includes a traveling path setter, an identifying unit, and a determiner. The traveling path setter is configured to set a traveling path of the vehicle based on the surrounding environment recognized by the recognizer. The identifying unit is configured to recognize an aerial object based on the feature information acquired by the feature information acquirer, and perform identification of a type of the recognized aerial object based on the feature information of the aerial object. The determiner is configured to determine whether the aerial object has a possibility of hindering traveling of the vehicle based on a result of the identification obtained by the identifying unit. The traveling control unit is configured to perform traveling control for the vehicle. The steering control unit is configured to perform predetermined steering control based on a control signal from the traveling control unit. The traveling control unit is configured to continue normal traveling control when the aerial object is determined not to have the possibility of hindering the traveling of the vehicle. The traveling control unit is configured to estimate a falling point of the aerial object when the aerial object is determined to have the possibility of hindering the traveling of the vehicle. The traveling control unit is configured to, when the estimated falling point is on the traveling path of the vehicle, set a new traveling path to steer around the falling point and execute the traveling control along the new traveling path.

An aspect of the disclosure provides a vehicle drive assist apparatus to be applied to a vehicle. The vehicle drive assist apparatus is configured to execute control for avoiding collision of the vehicle with a recognized object. The vehicle drive assist apparatus includes a detector and circuitry. The detector includes a sensor and is configured to recognize a surrounding environment around the vehicle. The detector is configured to acquire feature information of a three-dimensional object in the recognized surrounding environment. The circuitry is configured to centrally control a whole of the vehicle. The circuitry is configured to set a traveling path of the vehicle based on the recognized surrounding environment. The circuitry is configured to recognize an aerial object based on the acquired feature information, and perform identification of a type of the recognized aerial object based on the feature information of the aerial object. The circuitry is configured to determine whether the aerial object has a possibility of hindering traveling of the vehicle based on a result of the identification. The circuitry is configured to perform traveling control for the vehicle. The circuitry is configured to perform predetermined steering control based on a control signal. The circuitry is configured to, upon determining that the aerial object does not have the possibility of hindering the traveling of the vehicle, continue normal traveling control. The circuitry is configured to, upon determining that the aerial object has the possibility of hindering the traveling of the vehicle, estimate a falling point of the aerial object. The circuitry is configured to, when the estimated falling point is on the traveling path of the vehicle, set a new traveling path to steer around the falling point and execute the traveling control along the new traveling path.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

FIG. 7 is a flowchart illustrating a subroutine of a process of Step S12 of FIG. 6 (aerial object behavior recognition process).

DETAILED DESCRIPTION

Figure 1:
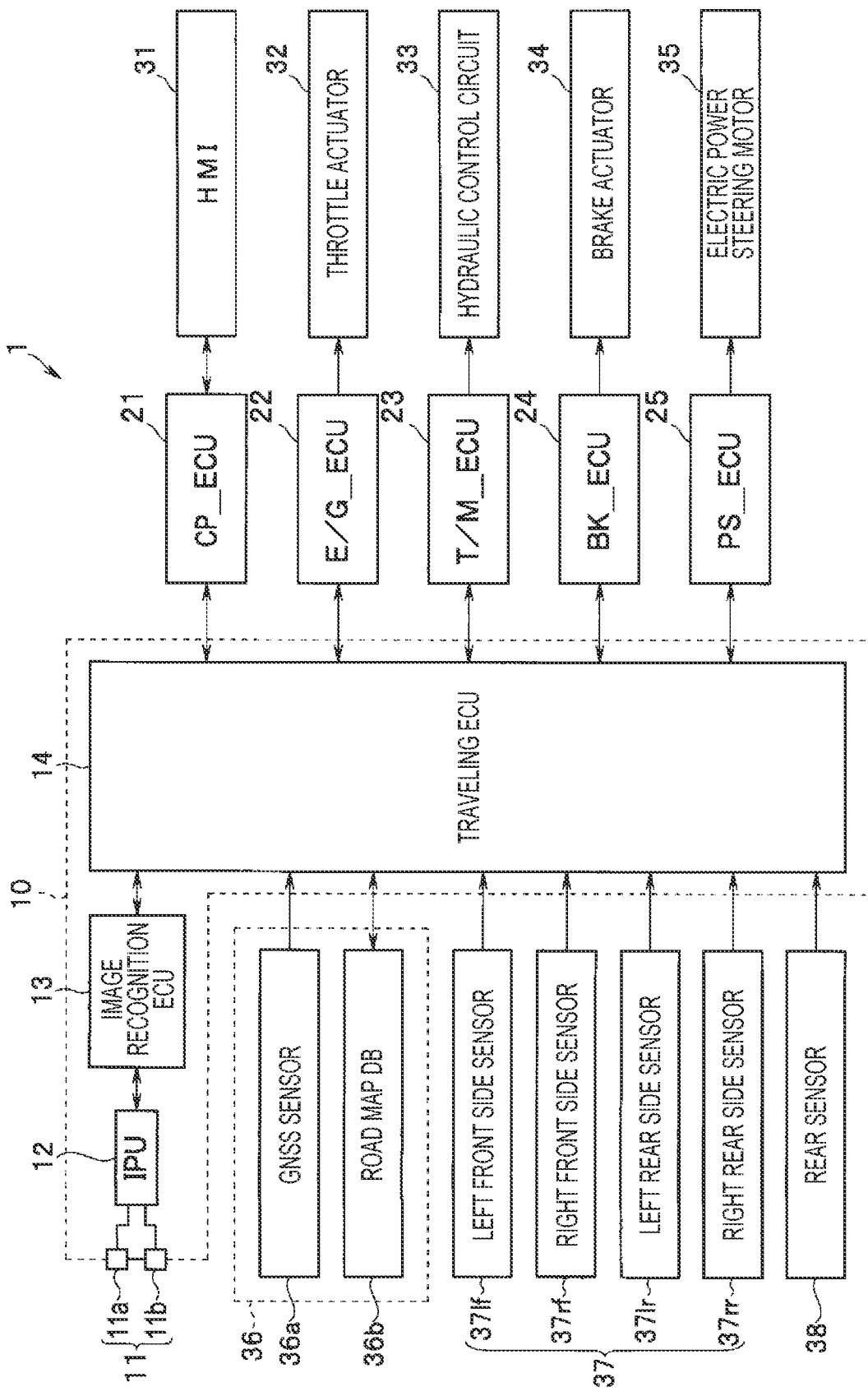
FIG. 1 is a block diagram illustrating a schematic configuration of a drive assist apparatus according to an embodiment of the disclosure.

The related-art drive assist apparatus may have difficulty in determining whether to avoid collision between the vehicle and an object recognized in the air (away from the road surface). Therefore, the related-art drive assist apparatus may execute predetermined obstacle avoidance control in response to recognition of an object unlikely to hinder the traveling of the vehicle, such as an airborne object or an object unlikely to fall onto the traveling path of the vehicle. In this case, the driver of the vehicle may have discomfort.

It is desirable to provide a vehicle drive assist apparatus configured to perform drive assist control for avoiding collision with an object recognized based on surrounding environment information acquired by using an on-board camera device and the like, and capable of constantly executing smooth traveling control without causing driver's discomfort.

An embodiment of the disclosure is described below. The drawings for use in the following description are schematic drawings. To illustrate constituent elements in recognizable sizes in the drawings, dimensional relationships and scales of members may be varied among the constituent elements. The embodiment of the disclosure is not limited to the embodiment in the drawings in terms of the numbers, shapes, size ratios, and relative positional relationships of the constituent elements in the drawings.

The schematic configuration of a drive assist apparatus according to the embodiment of the disclosure is described with reference to FIG. 1. FIG. 1 is a block diagram illustrating the schematic configuration of the drive assist apparatus according to the embodiment of the disclosure. As illustrated in FIG. 1, a drive assist apparatus 1 of this embodiment basically has a configuration substantially similar to those of related-art drive assist apparatuses of the same type. Therefore, the following description is directed to the schematic configuration of the drive assist apparatus 1 of this embodiment.

The drive assist apparatus 1 of this embodiment includes a camera unit 10 fixed to an upper central part of a front area in a cabin of a vehicle including the drive assist apparatus 1 (hereinafter referred to simply as "vehicle"). In one embodiment, the camera unit 10 may serve as an on-board camera device.

The camera unit 10 includes a stereo camera 11, an image processing unit (IPU) 12, an image recognition unit (image recognition ECU) 13, and a traveling control unit (traveling ECU) 14.

The stereo camera 11 is a sensing device recognizes a surrounding environment around a vehicle. In one embodiment, the stereo camera 11 may serve as a "recognizer". The stereo camera 11 includes a main camera 11a and a sub-camera 11b. For example, the main camera 11a and the subcamera 11b are disposed in the cabin of the vehicle at bilaterally symmetrical positions across the center in a vehicle width direction to face a forward side (in the traveling direction). For example, the main camera 11a and the subcamera 11b each include a CMOS image sensor, and generate a stereoscopic image by acquiring two images of a surrounding environment in an external forward area within a predetermined range from different viewpoints in every predetermined synchronous imaging period.

The IPU 12 performs predetermined image processing for surrounding environment image data obtained by the stereo camera 11 (image data showing the surrounding environment during traveling of the vehicle) to detect edges of various target objects such as objects in the image and lane lines on a road surface. Thus, the IPU 12 recognizes the three-dimensional objects and the lane lines around the vehicle. The IPU 12 acquires distance information from positional deviation amounts of corresponding edges in the right and left images, and generates image information including the distance information (distance image information).

The image recognition ECU 13 obtains, based on the distance image information received from the IPU 12, a road curvature [1/m] between right and left lane lines of a road where the vehicle is traveling (vehicle traveling road) and a width between the right and left lane lines (lane width). Various methods are known to obtain the road curvature and the lane width. For example, the image recognition ECU 13 obtains the road curvature in such a manner that right and left lane lines are recognized by binarization using a difference in brightness levels based on surrounding environment information and the curvatures of the right and left lane lines are obtained for each predetermined section by using a curve approximation expression based on the least-square method. The image recognition ECU 13 calculates the lane width from a difference in the curvatures of the right and left lane lines.

The image recognition ECU 13 calculates, based on the curvatures of the right and left lane lines and the lane width, a lane center and a vehicle lateral position deviation that is a distance from the lane center to the center of the vehicle in the vehicle width direction.

The image recognition ECU 13 performs predetermined pattern matching for the distance image information to recognize three-dimensional objects such as guardrails along the road, curbstones, and surrounding vehicles. In the recognition of three-dimensional objects, the image recognition ECU 13 recognizes, for example, types of the three-dimensional objects, heights of the three-dimensional objects, distances from the three-dimensional objects, speeds of the three-dimensional objects, relative speeds between the three-dimensional objects and the vehicle, and relative distances between the three-dimensional objects (for example, a lateral distance between a roadside curbstone and a lane line nearby).

Various types of information recognized by the image recognition ECU 13 are output to the traveling ECU 14 as first surrounding environment information.

In one embodiment, the image recognition ECU 13 of the drive assist apparatus 1 which recognizes the first surrounding environment around the vehicle in cooperation with the stereo camera 11 and the IPU 12 may serve as a "surrounding environment recognition device".

The traveling ECU 14 is a control unit that centrally controls the drive assist apparatus 1. Various control units such as a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25 are coupled to the traveling ECU 14 via an internal communication network such as a controller area network (CAN).

Various sensors such as a locator unit 36, on-board radar devices 37 (right front side sensor 37rf, left front side sensor 37lf, right rear side sensor 37rr, and left rear side sensor 37lr), and a rear sensor 38 are coupled to the traveling ECU 14.

A human-machine interface (HMI) 31 disposed near a driver's seat is coupled to the CP_ECU 21. For example, the HMI 31 includes a switch for giving instructions to execute various types of drive assist control, a mode selection switch for switching driving modes, a steering touch sensor that detects a steering wheel holding state of a driver, a driver monitoring system (DMS) that performs facial authentication of the driver and detects a line of sight, a touch panel display, a combination of meters, and a loudspeaker. In one embodiment, the touch panel display may serve as a "display panel".

In response to a control signal from the traveling ECU 14, the CP_ECU 21 notifies the driver as appropriate by display and sound through the HMI 31 about various types of information related to, for example, various alerts for a preceding vehicle, the status of the drive assist control, and the surrounding environment around the vehicle. The CP_ECU 21 outputs, to the traveling ECU 14, various types of information input by the driver through the HMI 31, such as ON/OFF operations on various types of drive assist control.

For example, a throttle actuator 32 of an electronically controlled throttle is coupled to an output side of the E/G_ECU 22. Various sensors such as an accelerator sensor (not illustrated) are coupled to an input side of the E/G_ECU 22.

The E/G_ECU 22 controls drive of the throttle actuator 32 based on, for example, a control signal from the traveling ECU 14 or detection signals from various sensors. Thus, the E/G_ECU 22 adjusts the intake amount of an engine to generate desired engine power. The E/G_ECU 22 outputs, to the traveling ECU 14, signals of an accelerator operation amount and the like detected by various sensors.

A hydraulic control circuit 33 is coupled to an output side of the T/M_ECU 23. Various sensors such as a shift position sensor (not illustrated) are coupled to an input side of the T/M_ECU 23. The T/M_ECU 23 performs hydraulic control for the hydraulic control circuit 33 based on, for example, a signal of an engine torque estimated by the E/G_ECU 22 and detection signals from various sensors. Thus, the T/M_ECU 23 changes the engine power at a desired speed ratio by operating, for example, friction engagement elements and pulleys in an automatic transmission. The T/M_ECU 23 outputs, to the traveling ECU 14, signals of a shift position and the like detected by various sensors.

A brake actuator 34 for adjusting brake fluid pressures to be output to brake wheel cylinders in individual wheels is coupled to an output side of the BK_ECU 24. Various sensors such as a brake pedal sensor, a yaw rate sensor, a longitudinal acceleration sensor, and a vehicle speed sensor (not illustrated) are coupled to an input side of the BK_ECU 24.

The BK_ECU 24 controls drive of the brake actuator 34 based on a control signal from the traveling ECU 14 or detection signals from various sensors. Thus, the BK_ECU 24 generates, for the wheels as appropriate, braking forces for forcible braking control and yaw rate control on the vehicle. The BK_ECU 24 outputs, to the traveling ECU 14, signals of a brake operation status, a yaw rate, a longitudinal acceleration, a vehicle speed, and the like detected by various sensors.

An electric power steering motor 35 for applying a steering torque of a rotational force from a motor to a steering mechanism is coupled to an output side of the PS_ECU 25. Various sensors such as a steering torque sensor and a steering angle sensor are coupled to an input side of the PS_ECU 25.

The PS_ECU 25 controls drive of the electric power steering motor 35 based on a control signal from the traveling ECU 14 or detection signals from various sensors. Thus, the PS_ECU 25 generates the steering torque for the steering mechanism. The PS_ECU 25 outputs, to the traveling ECU 14, signals of a steering torque, a steering angle, and the like detected by various sensors.

The locator unit 36 includes a GNSS sensor 36a and a high-accuracy road map database (road map DB) 36b.

The GNSS sensor 36a measures the position (latitude, longitude, and altitude) of the vehicle by receiving positioning signals from positioning satellites.

The road map DB 36b is a large-capacity storage medium such as an HDD or an SSD, and stores high-accuracy road map information (dynamic map). For example, the road map DB 36b stores lane width data, lane center position coordinate data, lane azimuth angle data, and speed limits as lane data for use in autonomous driving. The stored lane data includes pieces of data for several-meter intervals in each lane on the road map. The road map DB stores information on various facilities and parking lots. Based on, for example, a request signal from the traveling ECU 14, the road map DB 36b outputs road map information in a set range around the vehicle position measured by the GNSS sensor 36a to the traveling ECU 14 as third surrounding environment information.

In one embodiment, the road map DB 36b which recognizes the third surrounding environment around the vehicle in cooperation with the GNSS sensor 36a may serve as a "surrounding environment recognition device".

The right front side sensor 37rf, the left front side sensor 37lf, the right rear side sensor 37rr, and the left rear side sensor 37lr constitute the on-board radar devices 37. For example, the sensors are millimeter wave radars.

Each millimeter wave radar detects a three-dimensional object such as a pedestrian or a vehicle traveling side by side and a structure (three-dimensional object such as a curbstone, a guardrail, a wall of a building, or a plant) along a roadside (for example, an end at a road shoulder) by outputting radio waves and analyzing the reflected radio waves from the objects. Each millimeter wave radar also detects various three-dimensional objects on roads or in the air (away from road surfaces). For example, each radar detects a width of the three-dimensional object, a position of a representative point of the three-dimensional object (position and distance relative to the vehicle), and a relative speed as specific information related to the three-dimensional object.

For example, the right front side sensor 37rf and the left front side sensor 37lf are disposed on right and left sides of a front bumper. The right front side sensor 37rf and the left front side sensor 37lf detect, as second surrounding environment information, three-dimensional objects in right and left obliquely forward and side areas around the vehicle. Those areas are difficult to recognize from an image captured by the stereo camera 11.

For example, the right rear side sensor 37rr and the left rear side sensor 37lr are disposed on right and left sides of a rear bumper. The right rear side sensor 37rr and the left rear side sensor 37lr detect, as the second surrounding environment information, three-dimensional objects in right and left obliquely rearward and side areas around the vehicle. Those areas are difficult to recognize by the right front side sensor 37rf and the left front side sensor 37lf.

In one embodiment, the on-board radar devices 37 (right front side sensor 37rf, left front side sensor 37lf, right rear side sensor 37rr, and left rear side sensor 37lr) of the drive assist apparatus 1 which recognize the second surrounding environment around the vehicle may serve as a "surrounding environment recognition device". The pieces of information acquired by the sensors 37rf, 37lf, 37rr, and 37lr are sent to the image recognition ECU 13.

Examples of the rear sensor 38 include a sonar device. For example, the rear sensor 38 is disposed on the rear bumper.

The rear sensor 38 detects three-dimensional objects in a rearward area behind the vehicle as fourth surrounding environment information. This area is difficult to recognize by the right rear side sensor 37rr and the left rear side sensor 37lr. In one embodiment, the rear sensor 38 which recognizes the fourth surrounding environment around the vehicle may serve as a "surrounding environment recognition device".

Coordinates of the external targets in the first surrounding environment information recognized by the camera unit 10 including the image recognition ECU 13, the third surrounding environment information recognized by the locator unit 36, the second surrounding environment information recognized by the on-board radar devices 37 (right front side sensor 37rf, left front side sensor 37lf, right rear side sensor 37rr, and left rear side sensor 37lr), and the fourth surrounding environment information recognized by the rear sensor 38 are converted by the traveling ECU 14 into coordinates in a three-dimensional coordinate system having its origin at the center of the vehicle.

The traveling ECU 14 has driving modes such as a manual driving mode, a first traveling control mode, a second traveling control mode, and a limp home mode. The traveling ECU 14 can selectively switch the driving modes based on, for example, a status of operation on the mode selection switch of the HMI 31.

The manual driving mode is a driving mode in which the driver is assumed to hold the steering wheel. In this driving mode, the vehicle travels by driving operations of the driver, such as a steering operation, an accelerator operation, and a brake operation.

The first traveling control mode is also a driving mode in which the driver is assumed to hold the steering wheel. That is, the first traveling control mode is a so-called semi-autonomous driving mode or drive assist mode in which a target traveling path is set and the vehicle travels along the target traveling path by combining, for example, adaptive cruise control (ACC), active lane keep centering (ALKC) control, and active lane keep bouncing control as appropriate through control of, for example, the E/G_ECU 22, the BK_ECU 24, and the PS_ECU 25 while reflecting the driving operations of the driver.

The adaptive cruise control (ACC) is basically performed based on the first surrounding environment information input from the image recognition ECU 13. For example, the adaptive cruise control (ACC) is performed based on preceding vehicle information in the first surrounding environment information from the image recognition ECU 13.

The active lane keep centering control and the active lane keep bouncing control are basically performed based on the first surrounding environment information and the third surrounding environment information input from one or more of the image recognition ECU 13 and the locator unit 36. For example, the active lane keep centering control and the active lane keep bouncing control are performed based on lane line information in the first or third surrounding environment information from the image recognition ECU 13 or the locator unit 36.

The second traveling control mode is an autonomous driving mode that realizes a so-called hands-off function in which the vehicle travels along a target route (route map information) by combining, for example, the adaptive cruise control, the active lane keep centering control, and the active lane keep bouncing control as appropriate through control of, for example, the E/G_ECU 22, the BK_ECU 24, and the PS_ECU 25 without the steering wheel holding by the driver, the accelerator operation, and the brake operation.

In the limp home mode, the vehicle is automatically stopped, for example, at a side strip when the vehicle traveling in the second traveling control mode cannot continue the traveling in this mode and the driver cannot take over the driving operation (that is, the mode cannot be switched to the manual driving mode or the first traveling control mode).

In each of the driving modes described above, the traveling ECU 14 determines whether to execute obstacle avoidance control involving autonomous emergency braking (AEB: collision damage reduction braking) control and emergency steering control in response to recognition of a three-dimensional object such as a preceding vehicle or a fallen object on a vehicle traveling road with a strong possibility of colliding with the vehicle, and executes predetermined control as appropriate.

All or part of the locator unit 36, the image recognition ECU 13, the traveling ECU 14, the CP_ECU 21, the E/G_ECU 22, the T/M_ECU 23, the BK_ECU 24, and the PS_ECU 25 are/is a processor including hardware.

For example, the processor is constituted by known components and their peripheral devices including a central processing unit (CPU), a random access memory (RAM), a read only memory (ROM), a non-volatile memory, a non-volatile storage, and a non-transitory computer readable medium.

The ROM, the non-volatile memory, and the non-volatile storage prestore software programs to be executed by the CPU and fixed data such as data tables. The CPU reads the software programs stored in the ROM and the like and executes the software programs by loading the software programs in the RAM. The software programs implement the functions of the components and units (13, 14, 21 to 25, 36) by referring to various types of data as appropriate.

The processor may be implemented by a semiconductor chip such as a field programmable gate array (FPGA). The components and units (13, 14, 21 to 25, 36) may be implemented by electronic circuits.

The software programs may entirely or partly be recorded as computer program products in a non-transitory computer readable medium such as a portable sheet medium typified by a flexible disk, a CD-ROM, or a DVD-ROM, a card memory, a hard disk drive (HDD), or a solid state drive (SSD).

In one embodiment, a monocular camera may serve as a "surrounding environment recognition device" in place of (or in addition to) the stereo camera 11 in the camera unit 10. In one embodiment, a light detection and ranging (LiDAR) sensor may serve as a "surrounding environment recognition device" in place of (or in addition to) the on-board radar devices 37.

Operations of the drive assist apparatus 1 of this embodiment are described with reference to FIG. 2 to FIG. 7.

The drive assist apparatus 1 of this embodiment has a function of assisting driving operations of the driver by executing, for example, the adaptive cruise control (ACC), the active lane keep centering (ALKC) control, and the active lane keep bouncing (ALKB) control.

When an object is recognized on a traveling road or in the air, the drive assist apparatus 1 of this embodiment recognizes whether the object may hinder the traveling of the vehicle. When determination is made that the object may hinder the traveling of the vehicle, the drive assist apparatus 1 of this embodiment assists the driving by executing the obstacle avoidance control involving braking control and steering control. When determination is made that the object has no possibility of hindering the traveling of the vehicle, the obstacle avoidance control is suppressed.

Examples of the objects to be recognized by the drive assist apparatus 1 include various road marks such as lane lines and planar structures such as manholes. The planar structures, that is, the lane lines etc. are regarded as having no possibility of hindering the traveling of the vehicle in the related-art drive assist apparatuses.

There are three-dimensional objects on roads, such as permanently installed stationary objects typified by roadside curbstones, guardrails, utility poles, traffic signs, road information boards, and billboards, and moving objects typified by pedestrians, bicycles, other vehicles, and animals. Further, there are various three-dimensional objects on roads, such as temporarily installed stationary objects typified by signage and traffic cones near construction sites, and objects that have fallen from luggage spaces of other vehicles.

Those three-dimensional objects may hinder the traveling of the vehicle. For example, when the three-dimensional objects are present on a traveling path of the vehicle, the three-dimensional objects are recognized as objects that may hinder the traveling of the vehicle. When any of the three-dimensional objects is present in the air and is presumed to fall onto the traveling path of the vehicle, this three-dimensional object may hinder the traveling of the vehicle.

For example, empty plastic bags have small mass. Therefore, those objects (plastic bags) may float in the air due to wind or the like (hereinafter referred to as "airborne objects"). The airborne objects are three-dimensional objects but are unlikely to hinder the traveling of the vehicle. The drive assist apparatus 1 of this embodiment can recognize the airborne objects by acquiring their feature information.

Examples of the feature information of the airborne object unlikely to hinder the traveling of the vehicle include such features that the object is present in the air, that is, away from the road surface, the appearance size (area in a recognition image) is very small (minimal), the weight is small and therefore the falling speed is very low (the object falls at a low speed), the object falls not only in the gravity direction (the direction varies upward, downward, rightward, leftward, forward, or backward due to wind or the like and therefore the falling speed may also vary), the appearance size or shape changes while the object is falling (the shape changes due to wind or the like), and the transparency is high (some plastic bags are colorless and transparent).

Falling objects may hinder the traveling of the vehicle when their estimated falling points are on the traveling path of the vehicle. For example, empty cardboard boxes (three-dimensional objects) have small mass like the bag objects. Therefore, the cardboard boxes may fly in the air over roads due to strong wind or the like. The flying cardboard boxes do not always fall onto the traveling path of the vehicle. Thus, the falling objects are unlikely to hinder the traveling of the vehicle when their estimated falling points are not on the traveling path of the vehicle. The drive assist apparatus 1 of this embodiment can recognize various falling objects and estimate their falling points by acquiring their feature information.

Examples of the feature information of the falling object (for example, an empty cardboard box) unlikely to hinder the traveling of the vehicle include such features that the object is present in the air, that is, away from the road surface, the appearance size (area in a recognition image) is small, the weight is small and therefore the falling speed is low (the object falls at a low speed), the object falls not only in the gravity direction (the direction may vary upward, downward, rightward, leftward, forward, or backward due to strong wind or the like and the falling speed may also vary), and the appearance size or shape changes while the object is falling (the object rotates due to strong wind or the like and the angle of view from the vehicle changes).

Those pieces of feature information of the airborne object and the falling object can be acquired, for example, from results of the predetermined image processing performed based on images acquired by the camera unit 10. In one embodiment, while serving as a "surrounding environment recognition device", the camera unit 10 may also serve as a "feature information acquirer". The feature information acquired by the feature information acquirer is sent to the traveling ECU 14. The traveling ECU 14 identifies the type of the target object (for example, a stationary aerial object (detailed later), an airborne object, or a falling object) based on the received feature information, and as a determiner configured to determine whether the identified target object may hinder the traveling of the vehicle. In one embodiment, the traveling ECU 14 may serve as an "identifying unit".

Figure 2:
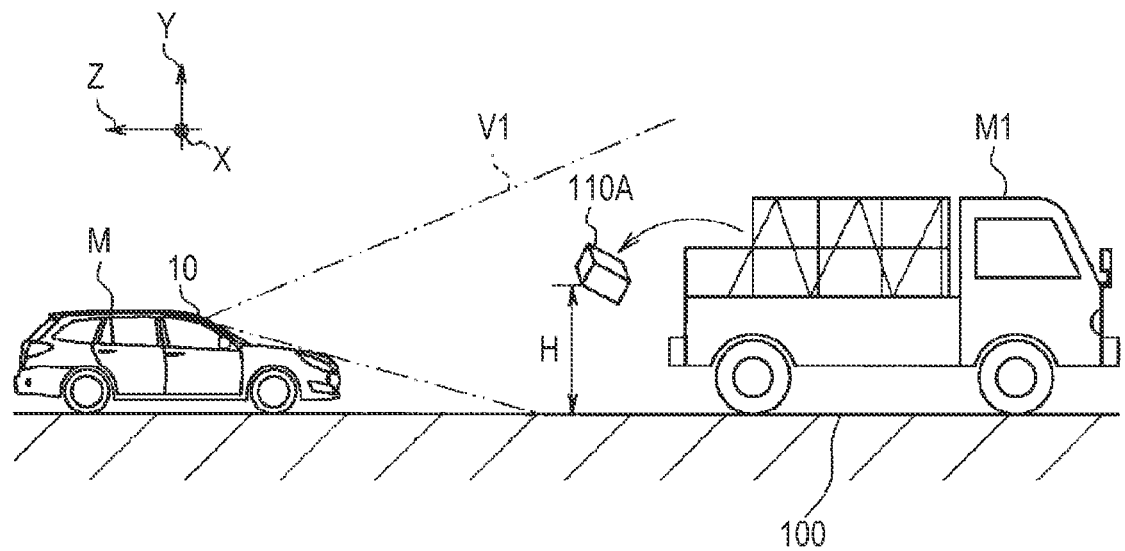
FIG. 2 is a conceptual side view of how a vehicle including the drive assist apparatus according to the embodiment of the disclosure recognizes an object ahead.
Figure 3:
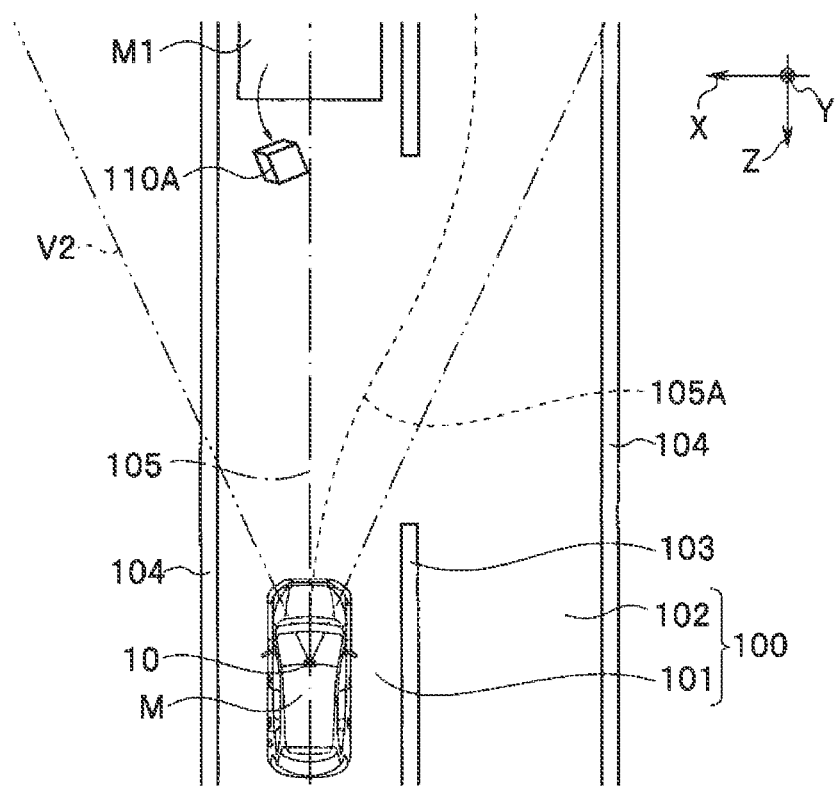
FIG. 3 is a conceptual top view of how the vehicle including the drive assist apparatus according to the embodiment of the disclosure recognizes the object ahead.
Figure 4:
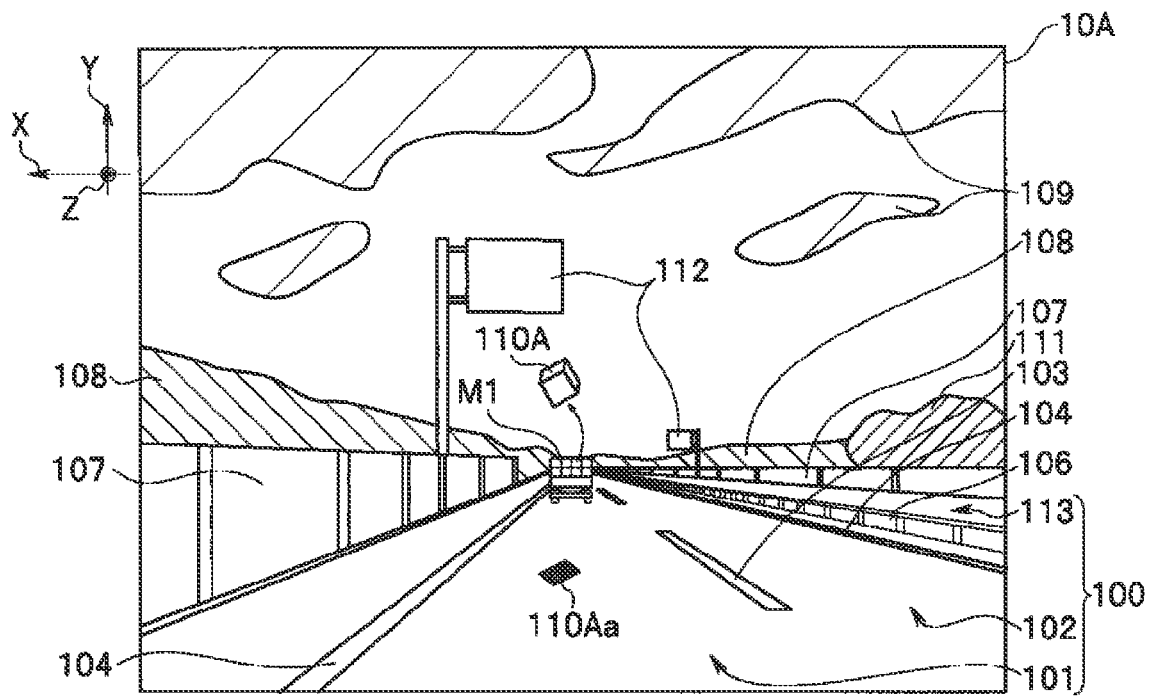
FIG. 4 is a diagram illustrating a display example of a forward image acquired by an on-board camera device of the vehicle including the drive assist apparatus according to the embodiment of the disclosure (in a case of a falling object)
Figure 5:
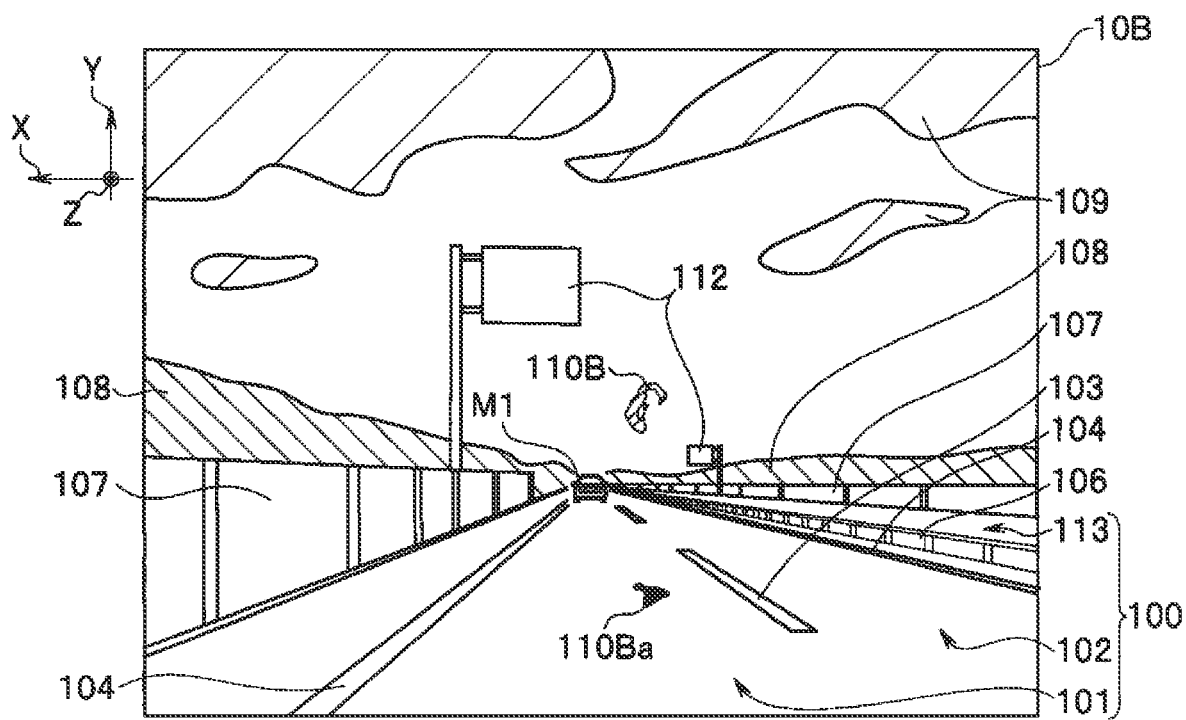
FIG. 5 is a diagram illustrating another display example of the forward image acquired by the on-board camera device of the vehicle including the drive assist apparatus according to the embodiment of the disclosure (in a case of an airborne object)

FIG. 2 to FIG. 5 are conceptual diagrams illustrating a situation in which the vehicle including the drive assist apparatus of this embodiment recognizes an object ahead in the traveling direction while traveling on a road. FIG. 2 is a conceptual side view of how the vehicle including the drive assist apparatus according to the embodiment of the disclosure recognizes the object ahead. FIG. 3 is a conceptual top view of the situation of FIG. 2. FIG. 4 and FIG. 5 are diagrams illustrating display examples of a forward image acquired by the on-board camera device of the vehicle including the drive assist apparatus according to the embodiment of the disclosure. FIG. 4 illustrates a display example of a forward image showing a falling object in the situation of FIG. 2 and FIG. 3. FIG. 5 illustrates a display example of a forward image showing an airborne object.

In FIG. 2, reference symbol 100 represents a road where the vehicle is traveling. In FIG. 2, reference symbol M represents the vehicle including the drive assist apparatus 1. The vehicle M includes the camera unit 10 serves as and the on-board camera device constituting the drive assist apparatus 1. In one embodiment, the camera unit 10 may serve as a "surrounding environment recognition device". The camera unit 10 is fixed at a predetermined position in the cabin of the vehicle M. In FIG. 2, reference symbol V1 represents the field of view (imaging range) of the stereo camera 11 of the camera unit 10. The field of view V1 corresponds to an angle of view of an image to be acquired by the camera unit 10. FIG. 2 illustrates the field of view V1 in a height direction. In FIG. 2, reference symbol M1 represents a preceding vehicle. Reference symbol 110A represents an object falling from the luggage space of the other vehicle M1. The falling object is in the air.

In FIG. 3, reference symbol 101 represents a traveling lane where the vehicle M and the other vehicle M1 are traveling (hereinafter referred to as "vehicle traveling lane"). In FIG. 3, reference symbol 102 represents a lane adjoining the vehicle traveling lane 101 (hereinafter referred to as "adjacent lane"). In a case where the road 100 has two lanes on one side, the adjacent lane 102 corresponds to a so-called passing lane. In FIG. 3, the road 100 may have one lane on one side. In this case, the adjacent lane 102 is an oncoming lane.

In FIG. 3, reference symbol 103 represents a lane line serving as a boundary for the vehicle traveling lane 101. Reference symbol 104 represents a roadside curbstone or lane line. Reference symbol 105 represents a traveling path along which the vehicle M is expected to travel (hereinafter referred to as "vehicle traveling path").

In FIG. 3, reference symbol V2 represents the field of view (imaging range) of the stereo camera 11 of the camera unit 10. The field of view V2 corresponds to the angle of view of the image to be acquired by the camera unit 10. FIG. 3 illustrates the field of view V2 in a lateral (width) direction.

FIG. 3 illustrates the side including the vehicle traveling lane 101 on the road having two lanes on one side, and illustration is omitted on a side including an oncoming lane. In FIG. 2 to FIG. 5, the same element is represented by the same reference symbol.

In FIG. 3, reference symbol 105A represents an example of a new traveling path to be generated to avoid collision between the vehicle M and the falling object 110A when the object 110A has fallen onto the vehicle traveling path 105. Details of the new traveling path 105A are described later (see, for example, a processing flow of FIG. 6).

In this situation, the vehicle M including the drive assist apparatus 1 is traveling along the vehicle traveling lane 101 of the road 100. The drive assist apparatus 1 continuously acquires images showing the surrounding environment (forward area in the traveling direction) at predetermined time intervals by using the camera unit 10, and recognizes the surrounding environment by performing the predetermined image processing based on the acquired image data.

The falling object 110A is present away from the surface of the road 100 (at a height H from the road surface; see FIG. 2) within a range defined by the fields of view V1 and V2 ahead of the vehicle M in the traveling direction. The drive assist apparatus 1 of the vehicle M recognizes the falling object 110A. FIG. 2 and FIG. 3 conceptually illustrate this situation.

FIG. 4 and FIG. 5 illustrate display examples of an image acquired by the camera unit 10 of the drive assist apparatus 1 of the vehicle M in the situation of FIG. 2 and FIG. 3.

In FIG. 4, reference symbol 10A represents an example of the image acquired by the camera unit 10. In FIG. 5, reference symbol 10B represents another example of the image acquired by the camera unit 10. The surroundings of the vehicle M (forward area in the traveling direction) are acquired as images within the ranges of the images 10A and 10B.

In FIG. 4, reference symbol 110A represents the falling object in the air as in FIG. 2 and FIG. 3. In FIG. 5, reference symbol 110B represents an airborne object floating in the air. In FIG. 4, reference symbol 110Aa represents the shadow of the falling object 110A on the road surface. In FIG. 5, reference symbol 110Ba represents the shadow of the airborne object 110B on the road surface.

In FIG. 4 and FIG. 5, reference symbol 106 represents a median strip of the road 100. Reference symbol 107 represents a boundary wall along a right or left side of the road 100. Reference symbol 108 represents mountain scenery in the distance. Reference symbol 109 represents scenery including cloud in the air. Reference symbol 111 (FIG. 4) represents a plant outside the road 100. Reference symbol 112 represents a road information board on the side of the road 100.

Reference symbol 113 represents an oncoming lane of the road 100. In the display examples of FIG. 4 and FIG. 5, the road 100 has two lanes on one side.

In FIG. 2 to FIG. 5, arrows X, Y, and Z indicate coordinate axes of a space including the vehicle M. The arrow X indicates a coordinate axis along the width direction of the vehicle M (lateral direction). In a forward view from the vehicle M, a leftward direction of the arrow X is a positive (+) direction. The arrow Y indicates a coordinate axis along the height direction of the vehicle M (vertical direction). In the forward view from the vehicle M, an upward direction of the arrow Y is a positive (+) direction. The arrow Z indicates a coordinate axis along the traveling direction of the vehicle M. A direction of the arrow Z from the forward side to the vehicle M is a positive (+) direction.

The drive assist apparatus 1 recognizes various objects in the surrounding environment around the vehicle M based on image data showing the image 10A or 10B.

In FIG. 4 and FIG. 5, the parts of the scenery represented by the reference symbols 108, 109, and 111 are recognized as the surrounding environment, but are regarded as having no possibility of affecting the traveling of the vehicle as in the related-art drive assist apparatuses.

Figure 6:
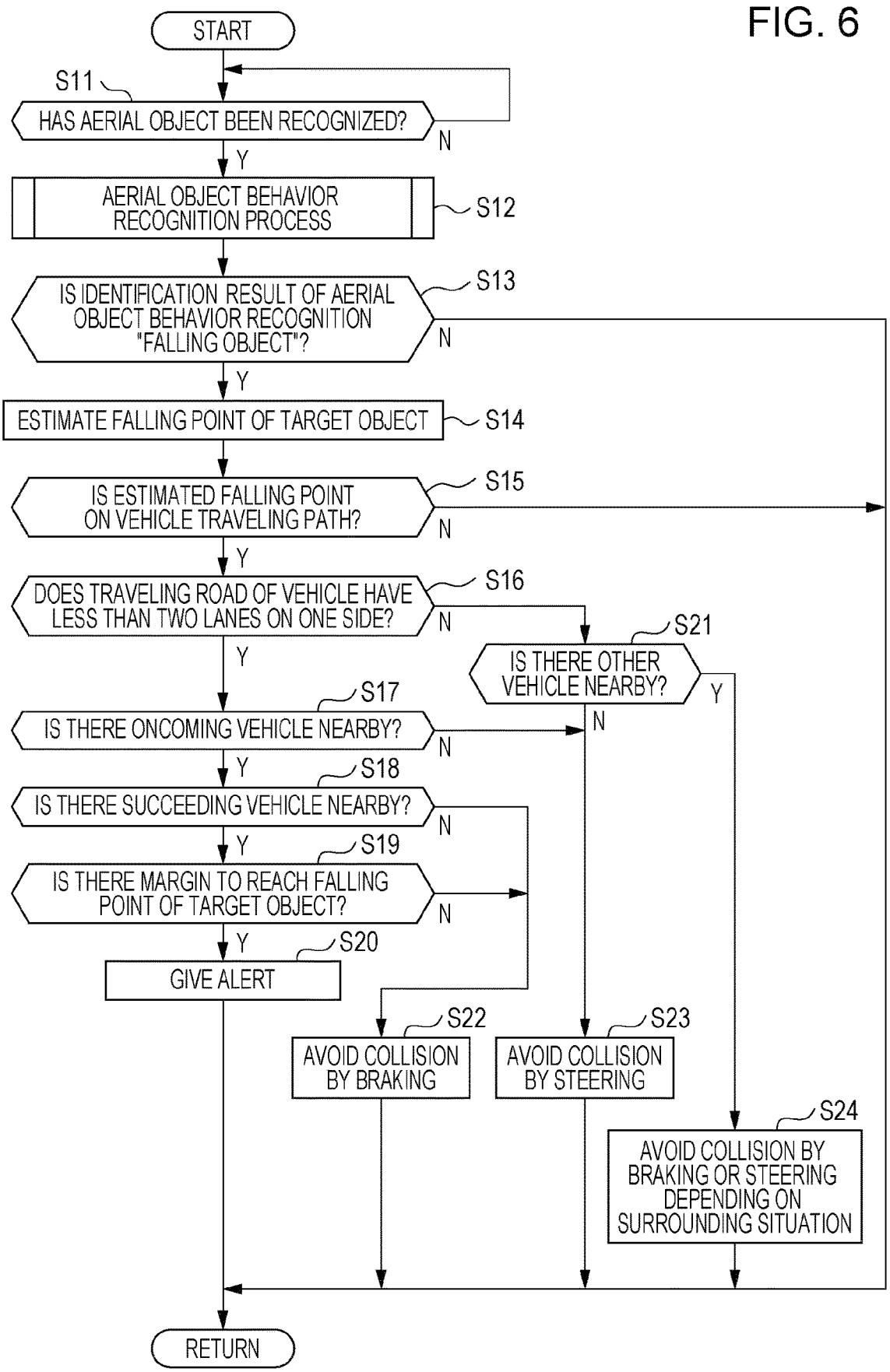
FIG. 6 is a flowchart illustrating a flow of operations of the drive assist apparatus according to the embodiment of the disclosure.

Operations of the drive assist apparatus 1 of the vehicle M in this situation are described with reference to flowcharts of FIG. 6 and FIG. 7. FIG. 6 is a flowchart illustrating a flow of the operations of the drive assist apparatus according to the embodiment of the disclosure. FIG. 7 is a flowchart illustrating a subroutine of a process of Step S12 of FIG. 6 (aerial object behavior recognition process). The following processing flow shows characteristic processes unique to the embodiment of the disclosure among various processes in the drive assist control to be executed by the drive assist apparatus 1 of this embodiment.

The vehicle M is traveling along the preset vehicle traveling path 105 in the vehicle traveling lane 101 of the road 100 in an ON state of the drive assist control of the drive assist apparatus 1 (for example, in the first traveling control mode). The drive assist apparatus 1 continuously recognizes the surrounding environment by using the surrounding environment recognition device (for example, the camera unit 10).

In Step S11 of FIG. 6, the drive assist apparatus 1 checks whether various recognized objects include an object in the air (hereinafter referred to as "aerial object"). Whether the recognized object is the aerial object is determined as follows.

For example, as illustrated in FIG. 2, the relative positional relationship between the height position of the sensor (camera unit 10) of the vehicle M and the height position of a target object is estimated based on image data. Thus, the height H of the target object from the road surface can be calculated. When the height H is equal to or larger than a predetermined threshold, the target object can be estimated as the aerial object.

For example, as illustrated in FIG. 4 and FIG. 5, a check is made as to whether a shadow (110Aa, 110Ba) associated with the target object (110A, 110B) is cast below the target object (on the surface of the road 100) in the image 10A or 10B. When the shadow of the target object is observed, the target object can be estimated as the aerial object. (110A, 110B).

When the aerial object is recognized in Step S11 of FIG. 6, the process proceeds to Step S12. In Step S12, the traveling ECU 14 executes a process of recognizing the behavior of the aerial object recognized in the process of Step S11 (aerial object behavior recognition process; see FIG. 7).

In Step S31 of FIG. 7, the traveling ECU 14 of the drive assist apparatus 1 checks whether the movement amount of the recognized aerial object in the positive (+) direction per unit time in terms of the behavior in the X direction (hereinafter referred to as "movement amount in X(+) direction per unit time"; the same applies to the Y and Z directions) is smaller than a predetermined threshold. When the movement amount of the target aerial object in the X(+) direction per unit time is smaller than the predetermined threshold, the process proceeds to Step S32. When the movement amount of the target aerial object in the X(+) direction per unit time is equal to or larger than the predetermined threshold, the process proceeds to Step S35.

In Step S35, the traveling ECU 14 checks whether the target aerial object is moving also in an X(−) direction. When the target aerial object is moving also in the X(−) direction, the process proceeds to Step S38. When the target aerial object is not moving in the X(−) direction, the process proceeds to Step S40.

In Step S40, the traveling ECU 14 checks whether the movement amount of the target aerial object in a Y(+) direction per unit time is smaller than a predetermined threshold. When the movement amount of the target aerial object in the Y(+) direction per unit time is smaller than the predetermined threshold, the process proceeds to Step S39. When the movement amount of the target aerial object in the Y(+) direction per unit time is equal to or larger than the predetermined threshold, the process proceeds to Step S38. In Step S38, the traveling ECU 14 identifies the target aerial object as an airborne object. Then, the process proceeds to Step S13 of FIG. 6 (RETURN).

In Step S39, the traveling ECU 14 identifies the target aerial object as a falling object that is relatively light to move in the air due to strong wind or the like. Then, the process proceeds to Step S13 of FIG. 6 (RETURN).

When the process proceeds to Step S38 from Step S35, the traveling ECU 14 identifies the target aerial object as an airborne object in Step S38. Then, the process proceeds to Step S13 of FIG. 6 (RETURN).

When the process proceeds to Step S32 from Step S31, the traveling ECU 14 checks in Step S32 whether the movement amount of the target aerial object in the Y(+) direction per unit time is smaller than the predetermined threshold. When the movement amount of the target aerial object in the Y(+) direction per unit time is smaller than the predetermined threshold, the process proceeds to Step S33. When the movement amount of the target aerial object in the Y(+) direction per unit time is equal to or larger than the predetermined threshold, the process proceeds to Step S38. In Step S38, the traveling ECU 14 identifies the target aerial object as an airborne object. Then, the process proceeds to Step S13 of FIG. 6 (RETURN).

When the process proceeds to Step S33 from Step S32, the traveling ECU 14 checks in Step S33 whether the movement amount of the target aerial object in a Z(+) direction per unit time is smaller than a predetermined threshold. When the movement amount of the target aerial object in the Z(+) direction per unit time is smaller than the predetermined threshold, the process proceeds to Step S34. In Step S34, the traveling ECU 14 identifies the target aerial object as a stationary aerial object. Then, the process proceeds to Step S13 of FIG. 6 (RETURN).

Examples of the stationary aerial object include stationary objects permanently installed away from road surfaces, such as traffic signs, road information boards, and billboards. In the images 10A and 10B illustrated in FIG. 4 and FIG. 5, the road information board 112 corresponds to the stationary aerial object.

When the movement amount of the target aerial object in the Z(+) direction per unit time is equal to or larger than the predetermined threshold in the process of Step S33, the process proceeds to Step S36.

In Step S36, the traveling ECU 14 checks whether the target aerial object is moving also in a Z(−) direction. When the target aerial object is moving also in the Z(−) direction, the process proceeds to Step S38. In Step S38, the traveling ECU 14 identifies the target aerial object as an airborne object. Then, the process proceeds to Step S13 of FIG. 6 (RETURN).

When the target aerial object is not moving in the Z(−) direction in the process of Step S36, the process proceeds to Step S37.

In Step S37, the traveling ECU 14 identifies the target aerial object as a falling object that is relatively heavy to move toward the vehicle M at a predetermined acceleration without the effect of wind or the like. Then, the process proceeds to Step S13 of FIG. 6 (RETURN).

In the manner described above, the drive assist apparatus 1 of this embodiment recognizes the aerial object and identifies the type of the recognized aerial object. Examples of the type of the aerial object to be identified include the stationary aerial object, the falling object (light or heavy), and the airborne object.

In Step S13 of FIG. 6, the traveling ECU 14 checks the identification result obtained in the process of Step S12 (aerial object behavior recognition process; see FIG. 7). When the identification result is "falling object", the process proceeds to Step S14. When the identification result is an object other than "falling object", the current normal traveling control is continued. Then, the series of processes is finished, and the process returns to the initial step (RETURN). The object other than "falling object" is "airborne object" or "stationary aerial object".

That is, when the recognized aerial object is "airborne object" or "stationary aerial object" other than "falling object", the drive assist apparatus 1 of this embodiment regards the aerial object or the like as an object having no possibility of hindering the traveling of the vehicle M, thereby suppressing the obstacle avoidance control.

In Step S14, the traveling ECU 14 estimates a falling point of the target object, that is, "falling object". The estimated falling point of the target object can be calculated based on, for example, feature information of the target object (various types of information such as size, falling speed, moving direction, and movement amount) and information on the speed of the vehicle M. The feature information of the target object is acquired in the process of Step S12 (subroutine of FIG. 7). The information on the vehicle M is acquired by the traveling ECU 14 at any time during the traveling.

In Step S15, the traveling ECU 14 checks whether the falling point estimated in the process of Step S14 overlaps an area on the vehicle traveling path 105 (see FIG. 3) where the vehicle M is currently traveling. When the estimated falling point of "falling object" is on the vehicle traveling path 105, the process proceeds to Step S16. When the estimated falling point of "falling object" is outside the vehicle traveling path 105, the current normal traveling control is continued. Then, the series of processes is finished, and the process returns to the initial step (RETURN).

Examples of "falling object" having a strong possibility that its estimated falling point is outside the vehicle traveling path 105 include an object that is relatively light to fly in the air due to strong wind or the like for a predetermined period. Examples include an empty cardboard box and an empty container made of various lightweight materials (polymer or plastic).

In Step S16, the traveling ECU 14 checks whether the current traveling road 100 of the vehicle M has less than two lanes on one side. When the traveling road 100 of the vehicle M has less than two lanes on one side, the process proceeds to Step S17. When the traveling road 100 of the vehicle M has two or more lanes on one side, the process proceeds to Step S21.

In Step S17, the traveling ECU 14 checks whether any oncoming vehicle is present around the vehicle M. When any oncoming vehicle is present around the vehicle M, the process proceeds to Step S18. When no oncoming vehicle is present around the vehicle M, the process proceeds to Step S23.

In Step S18, the traveling ECU 14 checks whether any succeeding vehicle is present around the vehicle M. When any succeeding vehicle is present around the vehicle M, the process proceeds to Step S19. When no succeeding vehicle is present around the vehicle M, the process proceeds to Step S22.

In Step S19, the traveling ECU 14 checks whether the vehicle M has a time or distance margin to reach the estimated falling point. When the vehicle M has the margin, the process proceeds to Step S20. When the vehicle M has no margin, the process proceeds to Step S22.

In Step S20, the traveling ECU 14 alerts the driver that "the falling object is present ahead" or "the falling object may fall onto the traveling path ahead". The alert is a visual alert displayed as an image on the HMI 31 (display panel), or an audio alert given by voice or sound using the HMI 31 (loudspeaker). The display panel and the loudspeaker of the HMI 31 notify the driver about predetermined information. In one embodiment, the display panel and the loudspeaker of the HMI 31 may serve as a "notification device". Then, the series of processes is finished, and the process returns to the initial step (RETURN).

When the process proceeds to Step S21 from Step S16, the traveling ECU 14 checks in Step S21 whether any other vehicle such as a succeeding vehicle, an oncoming vehicle, or a vehicle traveling side by side is present around the vehicle M. When any other vehicle is present around the vehicle M, the process proceeds to Step S24. When no other vehicle is present around the vehicle M, the process proceeds to Step S23.

When no oncoming vehicle is present in the process of Step S17 or when no other vehicle is present in the process of Step S21, the process proceeds to Step S23. In Step S23, the traveling ECU 14 executes the obstacle avoidance control, for example, by the steering control. In this case, the traveling ECU 14 generates a new traveling path 105A (see a dotted line in FIG. 3) to steer around the estimated falling point. Then, the traveling ECU 14 sets the newly generated traveling path 105A in place of the current vehicle traveling path 105. Then, the traveling ECU 14 executes traveling control for causing the vehicle M to travel along the newly generated traveling path 105A. Then, the series of processes is finished, and the process returns to the initial step (RETURN). The new traveling path 105A may be generated by the same method as that in the related-art obstacle avoidance control.

When no succeeding vehicle is present in the process of Step S18 or when the vehicle M has no time or distance margin to reach the estimated falling point in the process of Step S19, the process proceeds to Step S22. In Step S22, the traveling ECU 14 executes the obstacle avoidance control, for example, by the braking control. Then, the series of processes is finished, and the process returns to the initial step (RETURN).

When any other vehicle is present around the vehicle M in Step S21, the process proceeds to Step S24. In Step S24, the traveling ECU 14 executes the normal obstacle avoidance control including the braking control and the steering control depending on the surrounding situation. Then, the series of processes is finished, and the process returns to the initial step (RETURN).

In this case, determination is made in the process of Step S16 that the traveling road 100 has two or more lanes on one side. For example, when no oncoming vehicle is present and any other vehicle such as a succeeding vehicle or a vehicle traveling side by side is present, the control differs depending on whether the other vehicle is a succeeding vehicle in the vehicle traveling lane, whether the other vehicle is a succeeding vehicle or a vehicle traveling side by side in the adjacent lane, or whether the other vehicles are present both in the vehicle traveling lane and in the adjacent lane.

When the other vehicle (in this case, the succeeding vehicle) is present in the vehicle traveling lane, the vehicle that performs sudden braking to avoid collision with the falling object may affect the succeeding vehicle in the vehicle traveling lane. In this case, the vehicle performs steering control toward the adjacent lane where no succeeding vehicle is present.

When the other vehicle (in this case, one or more of the succeeding vehicle and the vehicle traveling side by side) is present in the adjacent lane, the vehicle that enters the adjacent lane or changes the lane to the adjacent lane by performing steering control to avoid collision with the falling object may affect the succeeding vehicle in the adjacent lane. In this case, the vehicle performs braking control in the vehicle traveling lane where no succeeding vehicle is present. After the succeeding vehicle in the adjacent lane has passed, the vehicle performs traveling control to avoid collision with the obstacle by entering the adjacent lane or changing the lane to the adjacent lane by steering control.

When the other vehicles are present both in the vehicle traveling lane and in the adjacent lane, the vehicle executes appropriate traveling control in consideration of the effect of the traveling path change of the vehicle on the succeeding vehicle.

When any oncoming vehicle is present and the vehicle is traveling in a lane near the center line, the vehicle performs steering control to change the traveling path to a traveling lane opposite to that of the oncoming vehicle.

According to the embodiment described above, when the vehicle M including the drive assist apparatus 1 is traveling along a road while recognizing the surrounding environment ahead in the traveling direction by using the surrounding environment recognition device (10, 37), an aerial object is recognized in the recognized surrounding environment. The traveling control unit 14 identifies the type of the recognized aerial object based on its feature information. The traveling control unit 14 determines whether the target object may hinder the traveling of the vehicle M based on the identification result. When determination is made that the target object has no possibility of hindering the traveling of the vehicle M, the normal traveling control for the vehicle M is continued. When determination is made that the target object may hinder the traveling of the vehicle M, the falling point of the target object is estimated. When the estimated falling point is on the vehicle traveling path 105, a new traveling path to steer around the estimated falling point is set and the traveling control is executed along the new traveling path.

With this configuration, when the recognized aerial object has no possibility of hindering the traveling of the vehicle M (the object is an airborne object or a light falling object), the obstacle avoidance control can be suppressed. When the recognized aerial object may hinder the traveling of the vehicle M (the object is a heavy falling object), the new traveling path to steer around the estimated falling point of the target object is set and the traveling control (obstacle avoidance control) can reliably be performed along the new traveling path. Thus, it is possible to constantly execute smooth drive assist control without causing driver's discomfort.

The embodiment of the disclosure is not limited to the embodiment described above, and various modifications and applications may be made without departing from the gist of the disclosure. The embodiment includes various aspects of the disclosure that may be extracted by any appropriate combination of the disclosed constituent elements. For example, some of the constituent elements in the embodiment may be omitted as long as the problems described above can be solved and the effects described above can be attained. The constituent elements of different embodiments may be combined as appropriate. The embodiment of the disclosure is limited to the appended claims but not limited to specific modes of implementation.

The traveling ECU 14 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the traveling ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle drive assist apparatus to be applied to a vehicle, the vehicle drive assist apparatus comprising:
   one or more sensors configured to obtain information regarding a surrounding environment around the vehicle;
   one or more processors; and
   one or more memories having programs, when executed, causing the one or more processors to be configured to:
      recognize the surrounding environment around the vehicle based on the information regarding the surrounding environment;
      acquire feature information of three-dimensional objects in the recognized surrounding environment,
      set a first traveling path of the vehicle based on the recognized surrounding environment;
      recognize an aerial object from among the three-dimensional objects based on the acquired feature information;
      identify a type of the aerial object based on movement amounts of the aerial object in a horizontal direction, a vertical direction, and a depth direction, by:
         comparing the movement amounts with respective thresholds; and determining whether the aerial object is:
(a) a stationary aerial object, when a first movement amount in one of left and right directions, a second movement amount in an upward direction, and a third movement amount in one of forward and backward directions of the aerial object are all less than first to third thresholds, respectively;
(b) a first type falling object, when the first movement amount in the one of left and right directions and the second movement amount in the upward direction are less than the first and second thresholds, respectively, and the third movement amount in the one of forward and backward directions is not less than third threshold, and when moving the aerial object in another one of forward and backward directions is not detected;
(c) an airborne object, when the first movement amount in the one of left and right directions and the second movement amount in the upward direction are less than the first and second thresholds, respectively, and the third movement amount in the one of forward and backward directions is not less than the third threshold, and when moving the aerial object in another one of forward and backward directions is detected; and
(d) a second type falling object, when the first movement amount in the one of left and right directions is not less than the first threshold, and the second movement amount in the upward direction is less than the second threshold, and when moving the aerial object in the another one of left and right directions is not detected;

estimate a falling point of the aerial object on a road surface based on the identified type of the aerial object;

determine whether the estimated falling point is on the first traveling path of the vehicle;

in response to determining that the estimated falling point is not on the first traveling path of the vehicle, continue traveling control along the first traveling path; and in response to determining that the estimated falling point is on the traveling path of the vehicle, set a second traveling path to steer around the falling point and execute traveling control along the second traveling path.

2. The vehicle drive assist apparatus according to claim 1, wherein the one or more sensors include a stereo camera.

3. The vehicle drive assist apparatus according to claim 2, wherein the one or more processors are further configured to perform predetermined braking control in response to determining that the estimated falling point is on the traveling path of the vehicle.

4. The vehicle drive assist apparatus according to claim 3, wherein the one or more processors are further configured to notify a driver who drives the vehicle about predetermined information in response to determining that the estimated falling point is on the traveling path of the vehicle.

5. The vehicle drive assist apparatus according to claim 4, wherein the one or more processors are further configured to control one or both of a display panel and a loudspeaker to notify the driver about the predetermined information.

6. The vehicle drive assist apparatus according to claim 2, wherein the one or more processors are further configured to notify a driver who drives the vehicle about predetermined information in response to determining that the estimated falling point is on the traveling path of the vehicle.

7. The vehicle drive assist apparatus according to claim 6, wherein the one or more processors are further configured to control one or both of a display panel and a loudspeaker to notify the driver about the predetermined information.

8. The vehicle drive assist apparatus according to claim 1, wherein the one or more processors are further configured to perform predetermined braking control in response to determining that the estimated falling point is on the traveling path of the vehicle.

9. The vehicle drive assist apparatus according to claim 8, wherein the one or more processors are further configured to notify a driver who drives the vehicle about predetermined information in response to determining that the estimated falling point is on the traveling path of the vehicle.

10. The vehicle drive assist apparatus according to claim 9, wherein the one or more processors are further configured to control one or both of a display panel and a loudspeaker to notify the driver about the predetermined information.

11. The vehicle drive assist apparatus according to claim 1, wherein the one or more processors are further configured to notify a driver who drives the vehicle about predetermined information in response to determining that the estimated falling point is on the traveling path of the vehicle.

12. The vehicle drive assist apparatus according to claim 11, wherein the one or more processors are further configured to control one or both of a display panel and a loudspeaker to notify the driver about the predetermined information.

13. The vehicle drive assist apparatus according to claim 1, wherein the one or more processors are further configured to:
estimate a relative positional relationship between a height position of the one of the one or more sensors and a height position of the three-dimensional object based on the acquired feature information;
obtain a height of the three-dimensional object from the road surface; and
in response to determining that the height of the three-dimensional object is equal to or greater than a first threshold, determine that the three-dimensional object is the aerial object.

14. The vehicle drive assist apparatus according to claim 1, wherein the one or more processors are further configured to:
recognize a shadow associated with the three-dimensional object below the three-dimensional object; and
in response to recognizing the shadow, determine that the three-dimensional object is the aerial object.

15. The vehicle drive assist apparatus according to claim 1, wherein the one or more processors are further configured to:
in response to recognizing the aerial object, compare movement amounts of the aerial object in three-dimensional directions with second thresholds, respectively; and
based on comparing the movement amounts of the aerial object with the second thresholds, respectively, determine whether the aerial object is a falling object or a floating object.

16. The vehicle drive assist apparatus according to claim 1, wherein, in response to determining that the estimated falling point of the aerial object is on the first traveling path, the one or more processors are further configured to:
  determine whether an oncoming vehicle is present;
  determine whether a succeeding vehicle is present;
  determine whether another vehicle is present around the vehicle; and
  determine whether a margin is available to reach the falling point of the aerial object; and
  perform one of:
    collision avoidance by braking, in response to determining that:
      (1) the oncoming vehicle is present, the succeeding vehicle is present, and the margin is not available, or
      (2) the oncoming vehicle is present and the succeeding vehicle is not present;
    collision avoidance by steering, in response to determining that:
      (1) the oncoming vehicle is not present, or
      (2) the another vehicle is not present around the vehicle; and
    collision avoidance by braking or steering depending on the surrounding conditions, in response to determining that the another vehicle is not present around the vehicle.

17. A vehicle drive assist apparatus to be applied to a vehicle, the vehicle drive assist apparatus comprising:
  one or more sensors configured to obtain information regarding a surrounding environment around the vehicle; and
  circuitry configured to:
    recognize a surrounding environment around the vehicle based on the information regarding the surrounding environment;
    acquire feature information of three-dimensional objects in the recognized surrounding environment;
    set a first traveling path of the vehicle based on the recognized surrounding environment;
    recognize an aerial object from among the three-dimensional objects based on the acquired feature information;
    identify a type of the aerial object based on movement amounts of the aerial object in a horizontal direction, a vertical direction, and a depth direction, by:
      comparing the movement amounts with respective thresholds; and
      determining whether the aerial object is:
        (a) a stationary aerial object, when a first movement amount in one of left and right directions, a second movement amount in an upward direction, and a third movement amount in one of forward and backward directions of the aerial object are all less than first to third thresholds, respectively;
        (b) a first type falling object, when the first movement amount in the one of left and right directions and the second movement amount in the upward direction are less than the first and second thresholds, respectively, and the third movement amount in the one of forward and backward directions is not less than third threshold, and when moving the aerial object in another one of forward and backward directions is not detected;
        (c) an airborne object, when the first movement amount in the one of left and right directions and the second movement amount in the upward direction are less than the first and second thresholds, respectively, and the third movement amount in the one of forward and backward directions is not less than the third threshold, and when moving the aerial object in another one of forward and backward directions is detected; and
        (d) a second type falling object, when the first movement amount in the one of left and right directions is not less than the first threshold, and the second movement amount in the upward direction is less than the second threshold, and when moving the aerial object in the another one of left and right directions is not detected;
    estimate a falling point of the aerial object on a road surface based on the identified type of the aerial object;
    determine whether the estimated falling point is on the first traveling path of the vehicle;
    in response to determining that the estimated falling point is not on the first traveling path of the vehicle, continue traveling control along the first traveling path; and
    in response to determining that the estimated falling point is on the traveling path of the vehicle, set a second traveling path to steer around the falling point and execute traveling control along the second traveling path.

18. The vehicle drive assist apparatus according to claim 17, wherein the circuitry is further configured to:
  estimate a relative positional relationship between a height position of the one of the one or more sensors and a height position of the three-dimensional object based on the acquired feature information;
  obtain a height of the three-dimensional object from a road surface; and
  in response to determining that the height of the three-dimensional object is equal to or greater than a first threshold, determine that the three-dimensional object is the aerial object.

19. The vehicle drive assist apparatus according to claim 17, wherein the circuitry is further configured to:
  recognize a shadow associated with the three-dimensional object below the three-dimensional object; and
  in response to recognizing the shadow, determine that the three-dimensional object is the aerial object.

20. The vehicle drive assist apparatus according to claim 17, wherein the circuitry is further configured to:
  in response to recognizing the aerial object, compare movement amounts of the aerial object in three-dimensional directions with second thresholds, respectively; and
  based on comparing the movement amounts of the aerial object with the second thresholds, respectively, determine whether the aerial object is a falling object or a floating object.

* * * * *